US009872101B2

United States Patent
Cordourier Maruri et al.

(10) Patent No.: US 9,872,101 B2
(45) Date of Patent: *Jan. 16, 2018

(54) SYSTEM FOR SOUND CAPTURE AND GENERATION VIA NASAL VIBRATION

(71) Applicant: Intel Corporation, Santa Clara, CA (US)

(72) Inventors: Hector A. Cordourier Maruri, Guadalajara (MX); Paulo Lopez Meyer, Tlaquepaque (MX); Willem M. Beltman, West Linn, OR (US); Jose R. Camacho Perez, Guadalajara Jalisco (MX); Julio C. Zamora Esquivel, Zapopan (MX); Alejandro Ibarra Von Borstel, Zapopan (MX)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,095

(22) Filed: Dec. 10, 2015

(65) Prior Publication Data
US 2017/0078464 A1 Mar. 16, 2017

Related U.S. Application Data

(63) Continuation-in-part of application No. 14/854,927, filed on Sep. 15, 2015.

(51) Int. Cl.
*H04R 1/46* (2006.01)
*H04M 1/60* (2006.01)
(Continued)

(52) U.S. Cl.
CPC .............. *H04R 1/46* (2013.01); *H04M 1/6041* (2013.01); *H04R 1/028* (2013.01); *H04M 1/05* (2013.01);
(Continued)

(58) Field of Classification Search
CPC .. H04R 1/1075; H04R 25/604; H04R 25/606; H04R 2460/13; G02C 11/06; G02C 11/10
See application file for complete search history.

(56) References Cited

U.S. PATENT DOCUMENTS

| | | | |
|---|---|---|---|
| 4,520,238 A | 5/1985 | Ikeda | |
| 2005/0286734 A1* | 12/2005 | Wang | G02C 11/06 381/381 |

(Continued)

FOREIGN PATENT DOCUMENTS

| | | |
|---|---|---|
| CN | 101742387 A | 6/2010 |
| JP | 03121603 A | 5/1991 |

(Continued)

OTHER PUBLICATIONS

Hakansson et al., "Resonance Frequencies of the Human Skull in Vivo Department of Applied Electronics", Chalmers University of Technology, Gothenburg, Sweden, Nov. 12, 1993.

(Continued)

*Primary Examiner* — Joshua Kaufman
(74) *Attorney, Agent, or Firm* — Grossman, Tucker, Perreault & Pfleger, PLLC (57) ABSTRACT

A system for sound capture and generation via nasal vibration is described. In embodiments the system includes eyeglasses that include at least a frame that is wearable by a user. Sensing circuitry is mounted to the frame, and a device is incorporated into the frame. The sensing circuitry includes at least one sensor, wherein the sensor can passively sense voice vibration induced in the user's nose, and/or which may actively induce audio vibration in the user's nose based on audio data.

19 Claims, 5 Drawing Sheets

(51) Int. Cl.
*H04R 1/02* (2006.01)
*H04R 25/00* (2006.01)
*H04M 1/05* (2006.01)
*H04M 1/725* (2006.01)

(52) U.S. Cl.
CPC ......... *H04M 1/7253* (2013.01); *H04R 25/604* (2013.01); *H04R 2460/13* (2013.01)

(56) References Cited

U.S. PATENT DOCUMENTS

| | | | |
|---|---|---|---|
| 2006/0140422 A1 | 6/2006 | Zurek et al. | |
| 2010/0110368 A1* | 5/2010 | Chaum | G02B 27/017 351/158 |
| 2011/0224481 A1* | 9/2011 | Lee | G02C 11/06 600/25 |
| 2012/0282976 A1* | 11/2012 | Suhami | G10K 11/1786 455/556.1 |
| 2013/0242262 A1 | 9/2013 | Lewis | |
| 2014/0029762 A1 | 1/2014 | Xie et al. | |

FOREIGN PATENT DOCUMENTS

| | | |
|---|---|---|
| KR | 10-2012-0080852 A | 7/2012 |
| KR | 10-2013-0035290 A | 4/2013 |

OTHER PUBLICATIONS

Carter, et al., "Estimation of the Magnitude-Squared Coherence Function via Overlapped Fast Fourier Transform Processing", IEEE Transactions on Audio and Electroacoustics, vol. AU-21, No. 4, Aug. 1973.
"Piezoelectric Sound Components", muRata catalogue, May 2014.
Welch, "The Use of Fast Fourier Transform for the Estimation of Power Spectra: A Method Based on Time Averaging Over Short, Modified Periodograms", IEEE Transactions on Audio and Electroacoustics, vol. AU-15, No. 2, Jun. 1967.
International Search Report and Written Opinion issued in PCT Application No. PCT/US2016/061420, dated Jan. 18, 2017, 15 pages.
International Search Report and Written Opinion issued in PCT Application No. PCT/US2016/047089, dated Oct. 26, 2016.
Office Action issued in U.S. Appl. No. 14/854,927, dated Sep. 1, 2016.

* cited by examiner

SYSTEM FOR SOUND CAPTURE AND GENERATION VIA NASAL VIBRATION

PRIORITY

The present patent application is a continuation-in-part (CIP) of co-pending U.S. patent application Ser. No. 14/854,927 filed Sep. 15, 2015 and entitled "System for Voice Capture via Nasal Vibration Sensing." The entire contents of the above-identified U.S. patent application are incorporated herein by reference.

TECHNICAL FIELD

The present disclosure relates to electronic communication, and more particularly, to a system for capturing a user's voice and generating sound for the user utilizing nasal resonation.

BACKGROUND

Electronic communication has become an integral part of modern society. For example, people may rely on mobile communications for business and/or personal interaction, to conduct financial transactions, to query for a variety of different data, for location-related assistance, to play games or watch multimedia presentations, etc. The expansion of various wireless networks such as global-area networks (GANs), wide-area networks (WANs) like the Internet, local-area networks (LANs), personal-area networks (PANs), etc., has further facilitated users in being able to perform even more activities on their mobile device in even more locations. Now users may be able to make calls, access the Internet, execute financial transactions, etc. while operating a motor vehicle, riding on public transportation, at work, at school, at home, at a public event, etc.

While the benefits of the above are readily apparent, possibly negative consequences may also exist. There are currently active campaigns against utilizing mobile devices while operating a motor vehicle. The operation of a mobile device when driving may divert the driver's attention away from the road and cause accidents. Moreover, it can be difficult to operate a mobile device at public events due to environmental noise. These problematic situations may be alleviated by the advent of "hands free" peripheral equipment. Hands free peripheral equipment may provide interfaces over which a user may interact with a mobile device that remains stored, in a charger, etc. This interaction may take place over a wired or wireless communication link. Examples of hands free peripheral equipment may include, but are not limited to, speakerphones, headsets, microphones, remote controls, etc. While these devices may be helpful, they are not all-purpose fixes. For example, headsets may facilitate hands-free communication, but may also experience problems in certain noisy situations. Wearing a headset also requires a user to maintain another device that they would not normally wear unless hands-free operations was desired or required, and in some regions wearing a headset (e.g., earpiece) may have negative stylistic implications.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure pertains to a system for voice capture via nasal vibration sensing. A system worn by a user may be able to sense vibrations through the nose of the user when the user speaks, generate an electronic signal based on the sensed vibration and generate voice data based on the electronic signal. In this manner, the system may capture a user's voice for use in, for example, dictation, telephonic communications, etc., while also screening out external noise (e.g., based on the natural sound dampening properties of the human skull). An example system may include a wearable frame (e.g., an eyeglass frame) on which is mounted at least one sensor and a device. The at least one sensor may sense vibration in the nose of a user and may generate the electronic signal based on the vibration. The device may receive the electronic signal from the at least one sensor and may generate voice data based on the electronic signal. Other features may include, for example, compensation for situations where vibration cannot be sensed, sound generation based on received audio data for use in, for example, telephonic communications, etc.

In at least one embodiment, an example system to capture a voice of a user may comprise at least a frame, at least one sensor mounted to the frame and a device mounted to the frame. The frame may be wearable by a user. The at least one sensor may be to generate an electronic signal based on vibration sensed in a nose of the user when the user talks. The device may be to at least receive the electronic signal from the at least one sensor and process the electronic signal to generate voice data.

The frame may be for eyeglasses. In this example implementation the at least one sensor may be incorporated within at least one nosepiece for the eyeglasses. It may also be possible for two sensors to be embedded in two sides of the nosepiece. For example, the two sensors may be coupled in series and the device is to receive a combined electronic signal generated by the two sensors. Alternatively, the device may be to select to process the electronic signal generated from one of the two sensors.

The at least one sensor may comprise a piezoelectric diaphragm to generate the electronic signal. The device may comprise at least control circuitry to generate the voice data from the electronic signal. The control circuitry may also be to determine whether the voice data includes a local command, and if determined to include a local command, perform at least one activity based on the local command. The device may also comprise at least communication circuitry to transmit the voice data to an external device and at least user interface circuitry to allow the user to interact with the system. In at least one embodiment, the user interface circuitry is to generate sound based on audio data received from the external device via the communication circuitry. Consistent with the present disclosure, an example method for capturing voice data from a user may comprise activating sensing for nasal vibration in a wearable system, sensing nasal vibration with at least one sensor in the wearable system, generating an electronic signal based on the nasal vibration and generating voice data based on the electronic signal.

Figure 1:
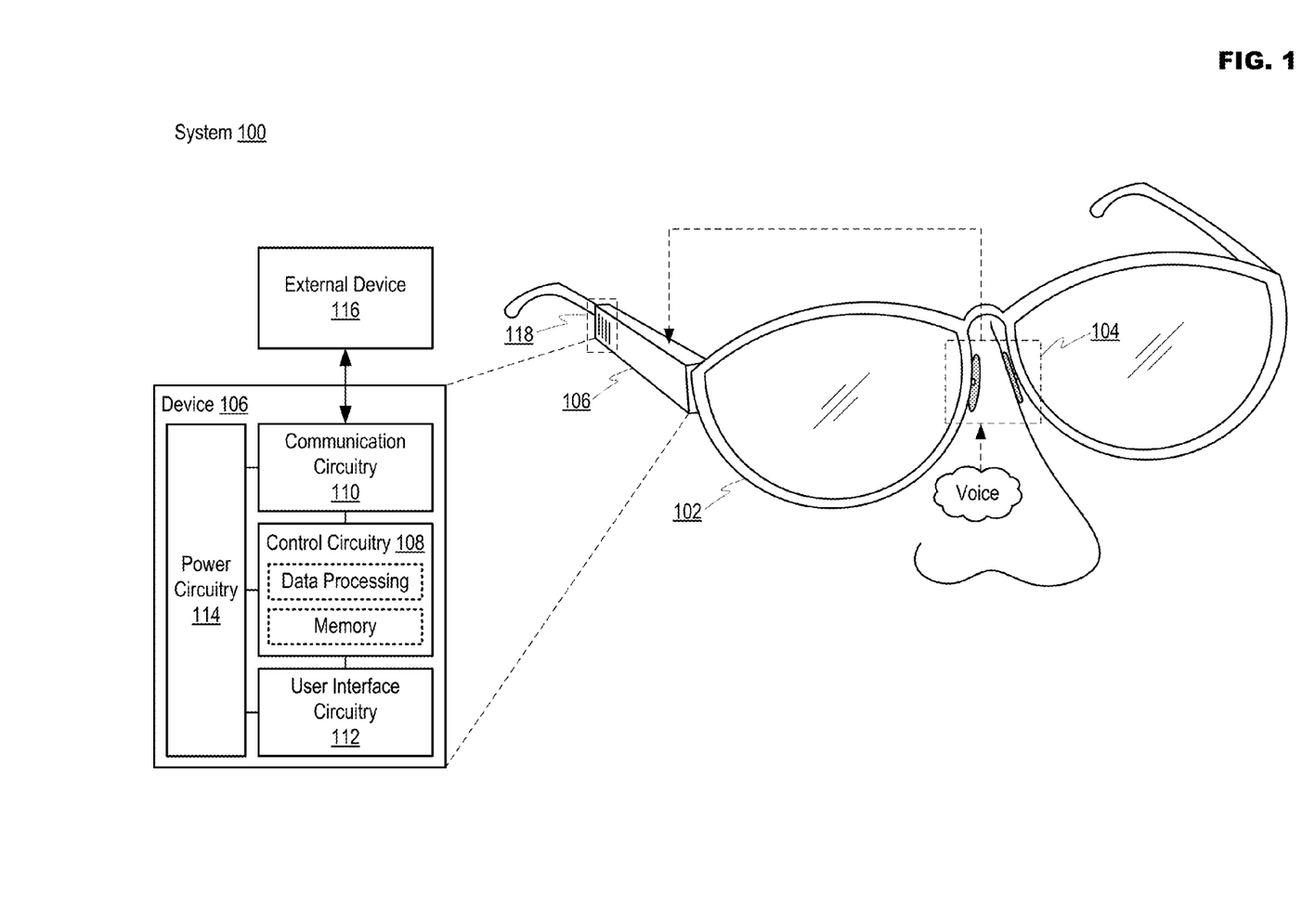
FIG. 1 illustrates an example system for voice capture via nasal vibration sensing in accordance with at least one embodiment of the present disclosure.

FIG. 1 illustrates an example system 100 for voice capture via nasal vibration sensing in accordance with at least one embodiment of the present disclosure. While examples of specific implementations (e.g., in eyeglasses) and/or technologies (e.g., piezoelectric sensors, Bluetooth wireless communications, etc.) will be employed herein, these examples are presented merely to provide a readily comprehensible perspective from which the more generalized devices, systems, methods, etc. taught herein may be understood. Other applications, configurations, technologies, etc. may result in implementations that remain consistent with the teachings presented herein.

System 100 may comprise a frame 102 on which at least one sensor 104 (e.g., hereafter, "sensor 104") and device 106 may be mounted. "Mounting" may include sensor 104 and device 106 being attached to frame 102 via mechanical attachment (e.g., screw, nail or other fastener), adhesive attachment (e.g., a glue, epoxy, etc.) or being incorporated within the structure of frame 102. Frame 102 is disclosed as a pair of eyeglasses only for the sake of explanation. Eyeglasses make an appropriate foundation on which various features consistent with the present disclosure may be implemented. Moreover, since eyeglasses, sunglasses, safety glasses, etc. are already routinely worn by people, it also means that there is little barrier to adoption of the technology. Users are not required to wear or carry additional equipment dedicated only to voice capture. Notwithstanding the foregoing advantages offered by eyeglasses of the types mentioned above, the teachings disclosed herein may alternatively be embodied in different form factors including, for example, any structure that touches, or is at least in proximity to, the nose and may be able to act as a platform for the variety of systems, devices, components, etc. that are described herein.

Sensor 104 may comprise vibration sensing circuitry. In at least one embodiment, the sensing circuitry may comprise, for example, piezoelectric components such as a diaphragm. Piezoelectric diaphragms may convert vibration (e.g., mechanical pressure waves) into electronic signals. Consistent with the present disclosure, the vibration sensing circuitry in sensor 104 may be in contact with, or at least proximate to, the nose of a user wearing frame 102. For example, the bridge of the user's nose is bone, and may resonate when the user speaks. Sensor 104 may be able to detect the vibration caused by the nasal bones resonating with the user's voice, and may convert the sensed vibration into an electronic signal that is then provided to device 106.

Device 106 may be configured to perform activities in system 100 such as, for example, generating voice data from the electronic signal generated by sensor 104, transmitting the voice data to external device 116, receiving audio data from external device 116, generating sound based on the received audio data, identifying and processing local commands, etc. Device 106 may comprise, for example, control circuitry 108, communication circuitry 110, user interface 112 and power circuitry 114. Control circuitry 108 may comprise at least data processing and memory resources. Data processing resources may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom®, Quark®, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which the data processing resources may interact with other system components that may be operating at different speeds, on different buses, etc. in device 106. Some or all of the functionality commonly associated with the support circuitry may also be included in the same physical package as the processor (e.g., such as in the Sandy Bridge family of processors available from the Intel Corporation).

The data processing resources may be configured to execute various instructions in device 106. Instructions may include program code configured to cause the data processing resources to perform activities related to reading data, writing data, processing data, formulating data, converting data, transforming data, etc. Information (e.g., instructions, data, etc.) may be stored in the memory resources. The memory resources may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on BIOS, UEFI, etc. to provide instructions when device 106 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Communication circuitry 110 may manage communications-related operations for device 106, which may include resources configured to support wired and/or wireless communications. Device 106 may comprise multiple sets of communication circuitry 110 (e.g., including separate physical interface circuitry for wired protocols and/or wireless radios). Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communications, satellite-based communications, etc.), electronic communications via sound waves, etc. In one embodiment, communication circuitry 110 may be configured to prevent wireless communications from interfering with each other. In performing this function, communication circuitry 110 may schedule communication activities based on, for example, the relative priority of messages awaiting transmission.

User interface circuitry 112 may include hardware and/or software to allow users to interact with device 106 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 112 may be incorporated within device 106 and/or may be coupled to device 106 via a wired or wireless communication medium. Power circuitry 114 may include internal power sources (e.g., battery, fuel cell, etc.) and/or external power sources (e.g., power grid, electromechanical or solar generator, external fuel cell, etc.) and related circuitry configured to supply device 106 with the power needed to operate.

External device 116 may include equipment that is at least able to process the voice data generated by device 106. Examples of external device 116 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc. or combinations thereof.

In an example of operation, system 100 may be worn by a user and activated manually by user interaction with user interface circuitry 112, or automatically by the user activating external device 116, activating an application on external device 116, speaking a local command, etc. In speaking a local command, device 106 may be in a power conservation mode and the speaking of a certain sound, word, phrase, etc. may be recognized by device 106 (e.g., in electronic signal form or after converted to voice data) as a local command to activate system 100 (e.g., transition device 106 from the power conservation mode to an active mode). Other local commands may, for example, deactivate system 100, mute system 100 (e.g., temporarily stop sensing operations or transmission operations), increase or decrease speaker volume, etc. Following the activation of system 100, sensor 104 may sense vibration in the nose of the user (e.g., the bony bridge of the user's nose), and may generate an electronic signal based on the vibration. The electronic signal may be received by device 106, which may generate voice data based on the electronic signal. For example, control circuitry 108 may convert the analog electronic signal into digital voice data. The next operation depends on the situation in which system 100 is being utilized. For example, if simple dictation is occurring then control circuitry 108 may store the voice data in memory for later retrieval. If engaged in a telephone call then communication circuitry 110 may transmit the voice data to external device 116 (e.g., a mobile communication device) and may receive audio data from external device 116 pertaining to the other party in the call. User interface circuitry 112 may then generate sound via, for example, speaker 118 so that the user may interact with the other caller. In at least one embodiment, the sound of the user's own voice may be generated through speaker 118 to provide auditory feedback to the user of system 100.

Figure 2:
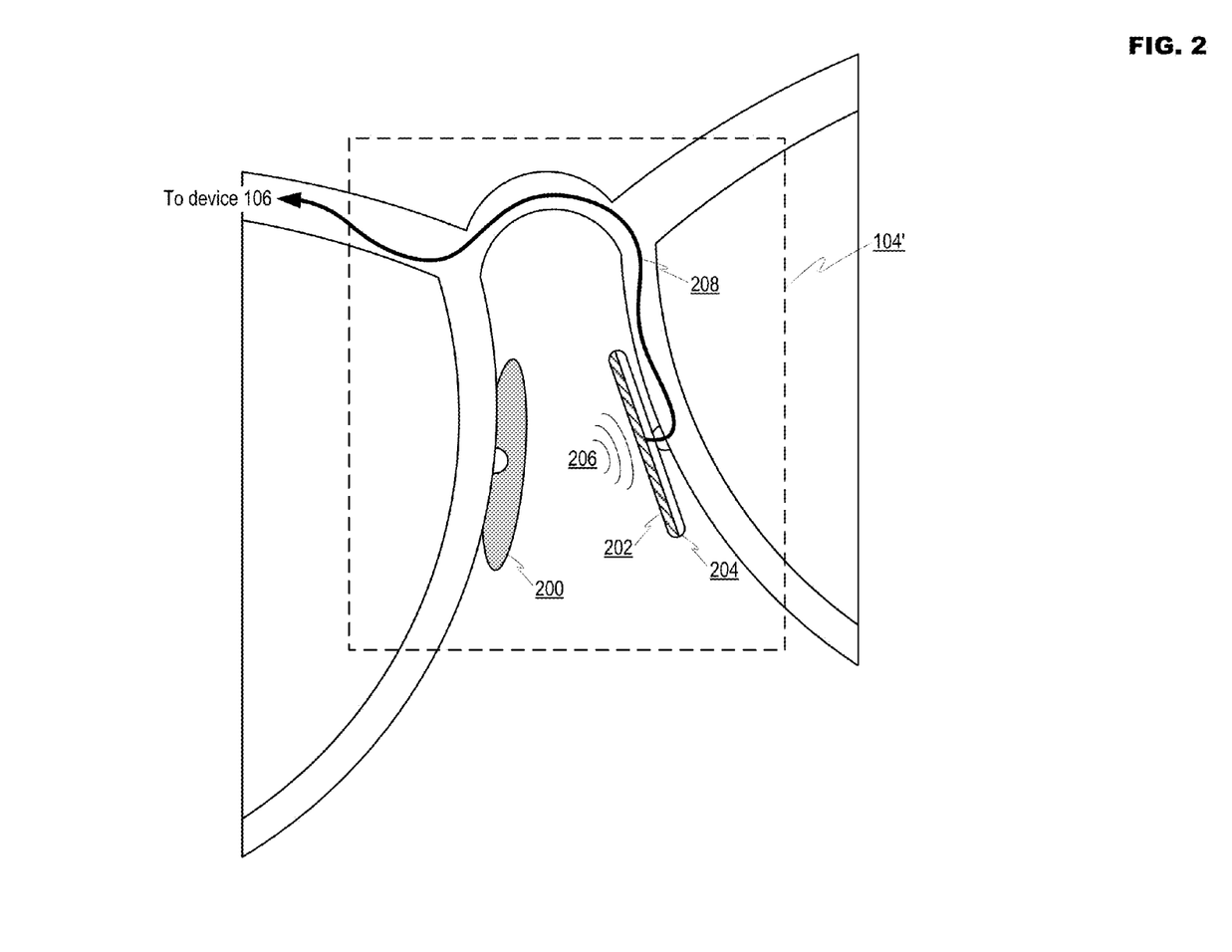
FIG. 2 illustrates an example configuration for a sensor in accordance with at least one embodiment of the present disclosure.

FIG. 2 illustrates an example configuration for sensor 104' in accordance with at least one embodiment of the present disclosure. FIG. 2 shows sensor 104' within a nosepiece 200. Nosepiece 200 may comprise, for example, at least sensing circuitry 202 affixed to structural support 204. Sensing circuitry 202 may include, for example, a piezoelectric diaphragm to convert vibration 206 into an electronic signal. Vibration 206 may occur due to cranial bones resonating from a user talking. This effect has dual benefits in that it allows the user's voice to be captured while also screening out external noise based on the human skulls natural ability to dampen external noise. The use of piezoelectric diaphragms is beneficial in that they are able to accurately generate an electronic signal indicative of voice and do not require external power (e.g., the pressure waves may compress a piezoelectric crystal to generate the electronic signal).

While wire 208 is shown in FIG. 2 to convey the electronic signal to device 106, the use of wireless communication is also possible to transmit the electronic signal. A variety of sensor configurations may be implemented consistent with the present disclosure. For example, given that two nosepieces 200 exist in a common pair of glasses, at least one of the two nosepieces 200 may include sensor 104'. In another example implementation, both nosepieces 200 may include sensor 104'. The sensors 104' in each nosepiece 200 may be wired in series to generate stronger electronic signals. In another embodiment, the sensors 104' in each nosepiece 200 may be wired individually, and resources in device 106 (e.g., control circuitry 108) may then select the sensor 104' to employ based on the strength of the electronic signals received from each sensor 104'. In this manner, system 100 may be able to account for the particularities in each user's nasal bones (e.g., breaks, natural deformities such as a deviated septum, etc.) and select the particular sensor 104' that may provide the strongest and cleanest electronic signal to use in generating voice data.

Figure 3:
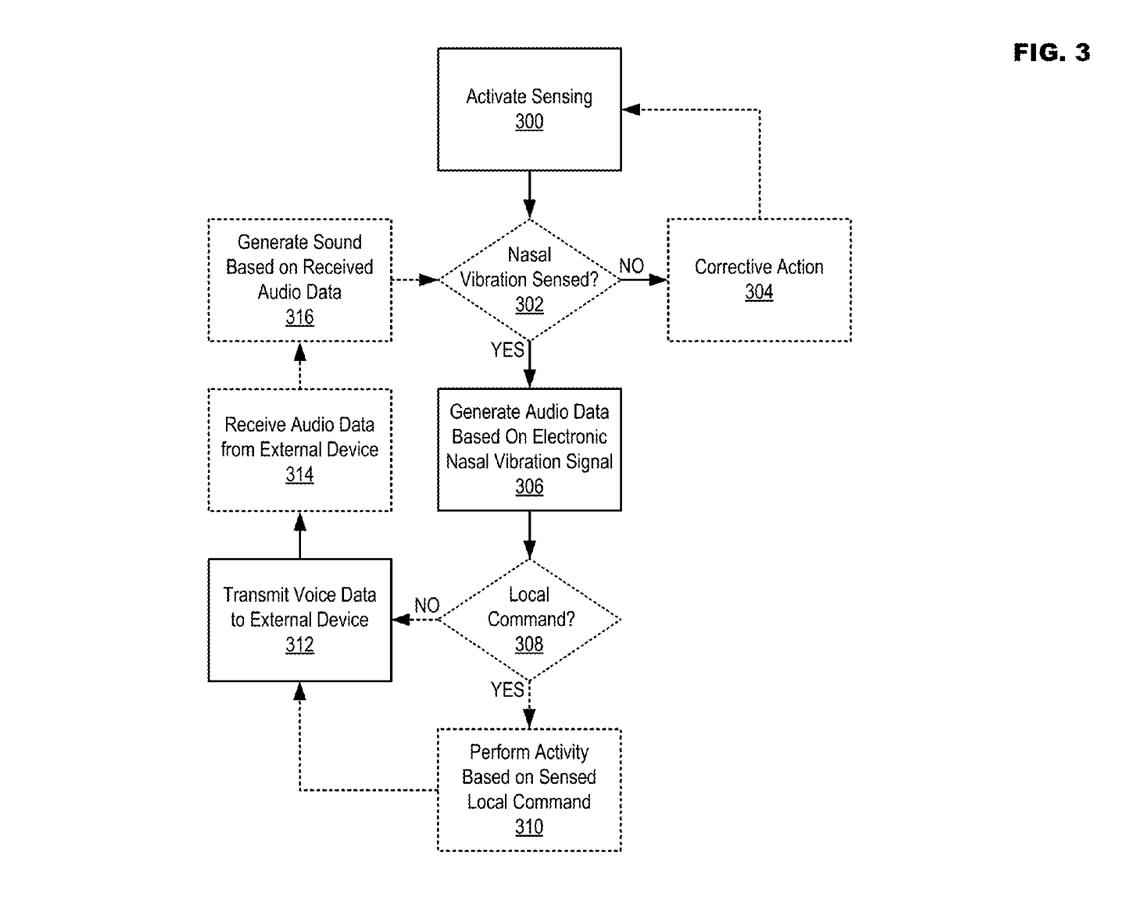
FIG. 3 illustrates example operations for voice capture via nasal vibration sensing in accordance with at least one embodiment of the present disclosure.

FIG. 3 illustrates example operations for voice capture via nasal vibration sensing in accordance with at least one embodiment of the present disclosure. Operations in FIG. 3 shown with a dotted outline may be optional based on the particulars of an implementation including, for example, the capabilities of the system (e.g., of the sensors, devices, etc. within the system), the configuration of the system, the use for which the system is intended, etc. In operation 300, nasal vibration sensing may be activated. Activation may be manual (e.g. instigated by a user of the system) or automatic (e.g., triggered by external device activity, local commands, etc.). A determination may be made in operation 302 as to whether nasal vibration is sensed by at least one sensor in the system. If in operation 302 it is determined that nasal vibration is not sensed, then in operation 304 at least one corrective action may occur. Examples of correction action may include generating an audible, visible and/or tactile notification to the user, reinitiating the system as illustrated by the arrow leading back to operation 300, the selection of another sensor in the system (e.g., when the system is eyeglasses, of a sensor in the opposite nosepiece), etc.

If in operation 302 it is determined that nasal vibration is sensed, then in operation 306 voice data may be generated based on an electronic signal generated by the at least one sensor. A determination may be made in operation 308 as to whether the electronic signal and/or voice data included a local command. For example, a set of local commands may be configured in the system, and control circuitry in the system may compare the electronic signal and/or voice data to the set of local commands to determine if a match exists. If in operation 308 it is determined that a local command was received, then in operation 310 at least one activity may be executed based on the sensed local command. Examples of activities that may be performed include, but are not limited to, turning on/off the system, adjusting system volumes, temporarily disabling voice capture and/or voice data transmission, etc. A determination in operation 308 that a local command was not received may be followed by transmitting the voice data to the external device (e.g., a mobile communication device like smartphone) in operation 312. In operation 314, audio data (e.g., voice data corresponding to other participants in a telephone call) may be received from the external device. Sound may be generated based on the received audio data in operation 316, which may be followed by a return to operation 302 to continue nasal vibration sensing.

Sound Capture and Generation Via Nasal Vibration

Consistent with the present disclosure, device 106 may also cause sensor 104 to operate "in reverse" to communicate sound to a user by inducing vibration in the nose (e.g., nasal bone) of the user. Vibration induced in the nasal bone is conveyed through the skull to sound sensing organs in the inner ear (e.g., the cochlea), which interpret the induced vibration as sound. This operation may occur even if the user has some defect, injury, etc. that ordinarily would prevent the user from hearing sound (e.g., a ruptured eardrum). In general, device 106 may have audio data, or may receive audio data, that is used to cause sensor 104 to induce audio vibration in the nose of the user. The communication may be one-way (e.g., wherein the user only listens to the incoming sound) or two-way (e.g., wherein the user both listens to incoming sound and sound is also captured from the user). Different modes for facilitating two-way communication will be discussed herein including, but not limited to, one-channel mode and signal modulation mode.

In at least one embodiment, a system to capture and generate sound may comprise, for example, at least a frame wearable by a user, sensing circuitry mounted to the frame and a device also mounted to the frame. The sensing circuitry may be to sense voice vibration induced in the user's nose by the user's voice, generate an electronic signal based on the sensed voice vibration and induce audio vibration in the nose based on audio data. The device may be to at least control the operation of the sensing circuitry.

In at least one embodiment, the frame may be an eyeglass frame comprising at least one nosepiece to contact the nose, the at least one nosepiece including at least the sensing circuitry. The sensing circuitry may comprise at least one piezoelectric diaphragm to generate the electronic signal and induce the audio vibration. In at least one example implementation, the sensing circuitry may comprise a first sensing circuit to sense the voice vibration and a second sensing circuit to induce the audio vibration.

In at least one embodiment, an example device may comprise at least control circuitry to determine whether the system is initiating or engaged in two-way communication. If the control circuitry determines that the system is not initiating or engaged in two-way communication, the control circuitry may then generate voice data based on the electronic signal or cause the sensing circuitry to induce the audio vibration based on the audio data. If it is determined that the system is initiating or engaged in two-way communication, the control circuitry may operate in single channel mode or signal modulation mode. In single channel mode the control circuitry may cause the sensing circuitry to generate an indication at least when audio data is incoming, cause the sensing circuitry to induce the audio vibration based on the audio data and, when no audio data is incoming, generate the voice data based on the electronic signal. In signal modulation mode the control circuitry may modulate the audio data, cause the sensing circuitry to induce the audio vibration based on the modulated data, receive the electronic signal, filter out the audio vibration from the electronic signal and generate the voice data based on the electronic signal. The device may further comprise at least communication circuitry to at least one of transmit the voice data to an external device or receive the audio data from the external device. Consistent with the present disclosure, an example method for capturing and generating sound may comprise activating a system wearable by a user, determining whether the system is initiating or engaged in two-way communication, controlling, based on the determination, sensing circuitry in the system to at least one of sense voice vibration induced in the user's nose by the user's voice and generate an electronic signal based on the voice vibration, or induce audio vibration in the nose based on audio data.

Figure 4:
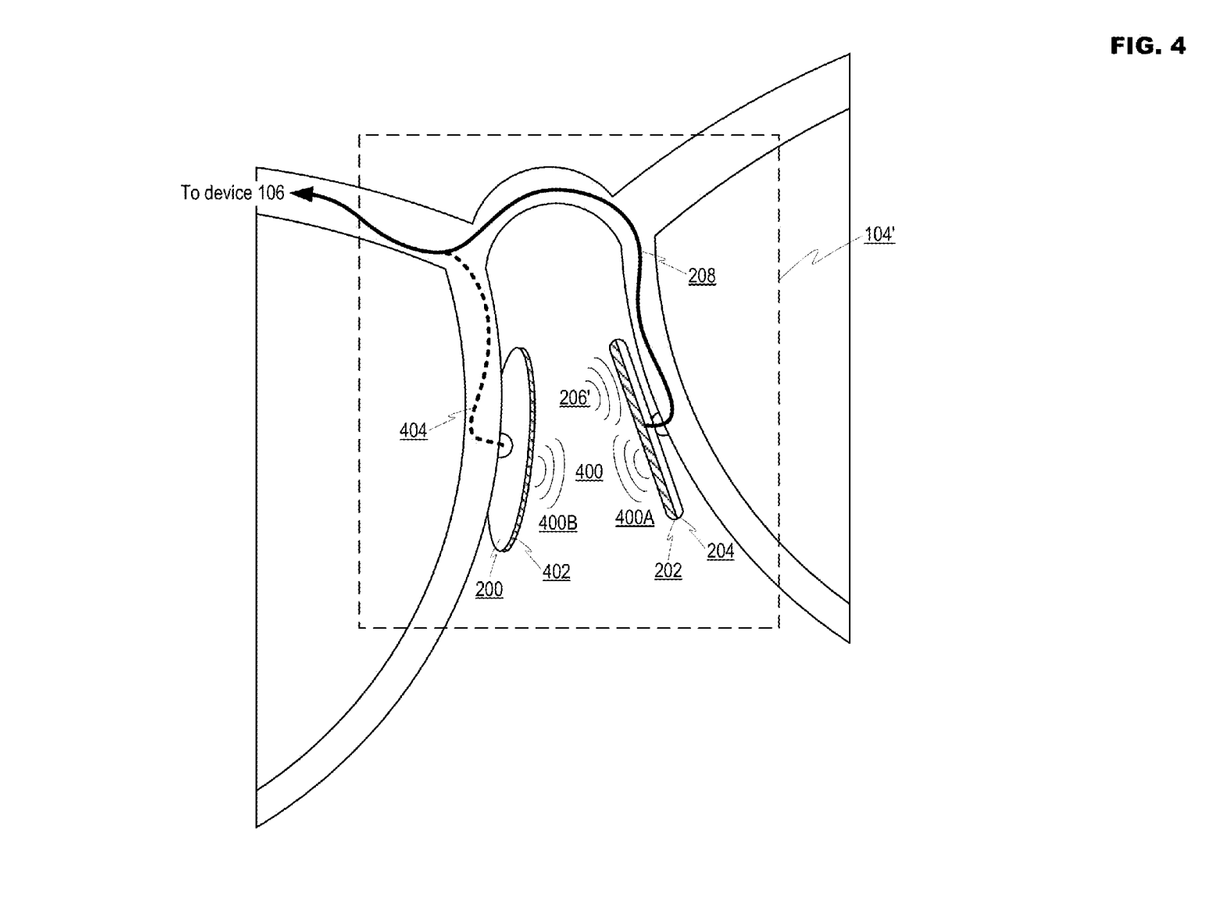
FIG. 4 illustrates an example configuration for a sensor further operating as a transducer in accordance with at least one embodiment of the present disclosure.

FIG. 4 illustrates an example configuration for a sensor further operating as a transducer in accordance with at least one embodiment of the present disclosure. In the various embodiments illustrated in FIGS. 1 to 3, sensor 104' was only relied upon to capture sound (e.g., voice) generated locally by a user. FIG. 4 shows an embodiment wherein sensor 104' may operate as a transducer (e.g., both to capture local sound and also induce audio vibration in a user's nose) so that the user may hear sound based on audio data. Audio data may include any data stored in, or received by, device 106 for use in causing sensor 104' to generate audio vibration. Audio data is described in the above examples a being a voice of another party in a telephone call in which the user of system 100 is participating. However, this is merely one example of audio data. Consistent with the present disclosure, system 100 may support one-way or two-way communications. One-way communications may comprise a user of system 100 either capturing voice data (e.g., recording for dictation, recording reminders, etc.) or listening to sound induced by nasal vibration. A user may only listen to sound when, for example, they are listening to music, spoken content such as recorded messages, an audio book, a lecture or other similar presentation. Audio data may be stored in device 106 (e.g., in memory within control circuitry 108) or may be received in device 106 (e.g., via communication circuitry 110). In an example of operation, a user may interact with user interface circuitry 112 in device 106 and/or external device 116 (e.g., with an audio application in external device 116) to select audio data and trigger the playback of audio data. Regardless of whether the audio data is stored within device 106 or streamed from an external source (e.g., from external device 116), control circuitry 108 may process the audio data, if required (e.g., to adjust the volume, frequency, pitch, tone, etc. of the audio data based on, for example, the manner in which sensor 104' induces the audio vibration), and generate a signal (e.g., driving signal) that causes sensor 104' to induce the audio vibration in the nose of the user. Two-way communications may involve both capturing sound locally generated by the user and also inducing audio vibration based on audio data. The most typical example of two-way communication is the user of system 100 talking on the phone.

FIG. 4 illustrates that, in addition to capturing vibration 206 generated by the user's voice (hereafter, "voice vibration 206"), sensor 104' may further be able to induce audio vibration 400 (e.g., based on audio data). Examples of audio vibration are shown at 400A and 400B in FIG. 4. In at least one implementation, a single sensing circuit 202 may both sense voice vibration 206' and induce audio vibration 400A. This may occur in that the actual sensor (e.g., a piezoelectric diaphragm) may continuously sense voice vibration 206' in a substantially passive manner until provided with a signal from device 106 that causes to the piezoelectric diaphragm to actuate and induce audio vibration 400A. Thus, transitioning from passively sensing voice vibration 206' to actively inducing audio vibration 400A may principally be controlled by device 106, which may selectively receive electronic signals generated by passive sensing or generate driving signals to induce audio vibration 400A. In a different implementation, sensor 104' may include more than one sensing circuit 202. For example, multiple piezoelectric diaphragms may be incorporated in, or may at least be coupled to, one or both nosepieces 200 (e.g., depending on nosepiece and/or diaphragm size, shape, etc.). The plurality of piezoelectric diaphragms may be coupled in series to generate stronger electronic signals when sensing voice vibration 206' and/or induce stronger audio vibration 400. In at least one embodiment, nosepieces 200 may each include piezoelectric diaphragms to generate audio vibrations 400A and 400B, respectively. Audio vibrations 400A and 400B may be induced to have amplitude or phase differences so that the source for each of the induced audio vibrations may be determined. The source indication may be utilized for, for example, calibration, debugging, etc. In another possible implementation, each of the plurality of piezoelectric diaphragms may be dedicated to only sensing voice vibration 206' or inducing audio vibration 400. For example, sensing circuitry 202 may be dedicated to only sensing voice vibration 206', while sensing circuitry 402 in the other nosepiece 200 may be dedicated to only inducing audio vibration 400B. In this instance, second coupling 404 (e.g., an additional wire) may be used to couple sensing circuitry 402 in the other nosepiece 200 to device 106. While illustrated as wire, coupling 404 may also be wireless connection (e.g., via Bluetooth, NFC, etc.).

Regardless of the actual configuration, at least one challenge posed by two-way operation is managing operation of sensor 104'. Voice vibration 206' caused by the user's voice and audio vibration 400 induced based on incoming audio data could foreseeably occur concurrently, and thus, could interfere with each other. For example, a single piezoelectric diaphragm cannot both sense and generate vibration at the same time. As a result, voice vibration 206' would be missed when audio vibration 400A is induced. Moreover, in a configuration where sensor 104' includes a plurality of piezoelectric diaphragms dedicated only to sensing vibration or inducing vibration, a sensing piezoelectric diaphragm may sense both voice vibration 206' and audio vibration 400B when they occur concurrently. Voice data generated using this captured mix of voice vibration 206' and audio vibration 400B may be may be garbled, unintelligible, etc., and thus, unusable.

Consistent with the present disclosure, control circuitry 108 in device 106 may facilitate two-way communication by operating in a mode that avoids the above situations. While various operational modes are disclosed herein, these operational modes are offered merely as examples of ways to avoid the above issues, and are not intended to limit the disclosed embodiments to any particular manner of operation. A first example mode of operation is single channel operation. In single channel operation, control circuitry 108 may limit sensor 104' to only to sensing voice vibration 206' or generating audio vibration 400. An indication such as, for example, a short tone, a short vibration (e.g., from electromechanical circuitry in user interface circuitry 512, etc. may indicate to the user at least when audio data is incoming. The incoming audio indication may help prevent the user from attempting to talk over audio vibration 400, which would result in the voice of the user not being recorded. In at least one embodiment, another indication may inform the user that all of the incoming audio data has been presented (e.g., via audio vibration 400), allowing the user to proceed with voice capture.

In signal modulation mode, control circuitry 108 may modulate the audio data, or a signal generated from the audio data for driving sensor 104' to induce audio vibration 400, so that noise including audio vibration 400 may later be filtered out from the capture of voice vibration 206'. Modulation, as referenced herein, generally comprises the modification of at least one property of a waveform. For example, the frequency of the signal driving sensor 104' may be modified to make it higher or lower than the expected frequency of voice vibration 206'. As a result, while it may be possible to capture both voice vibration 206' and audio vibration 400 that is occurring at the same time, low-pass or high-pass filtering may later be employed by control circuitry 108 to filter out captured the noise (e.g., audio waveform 400) from the desired waveform (e.g., voice vibration 206'). The waveform may be converted to voice data for storage, transmission, etc.

Figure 5:
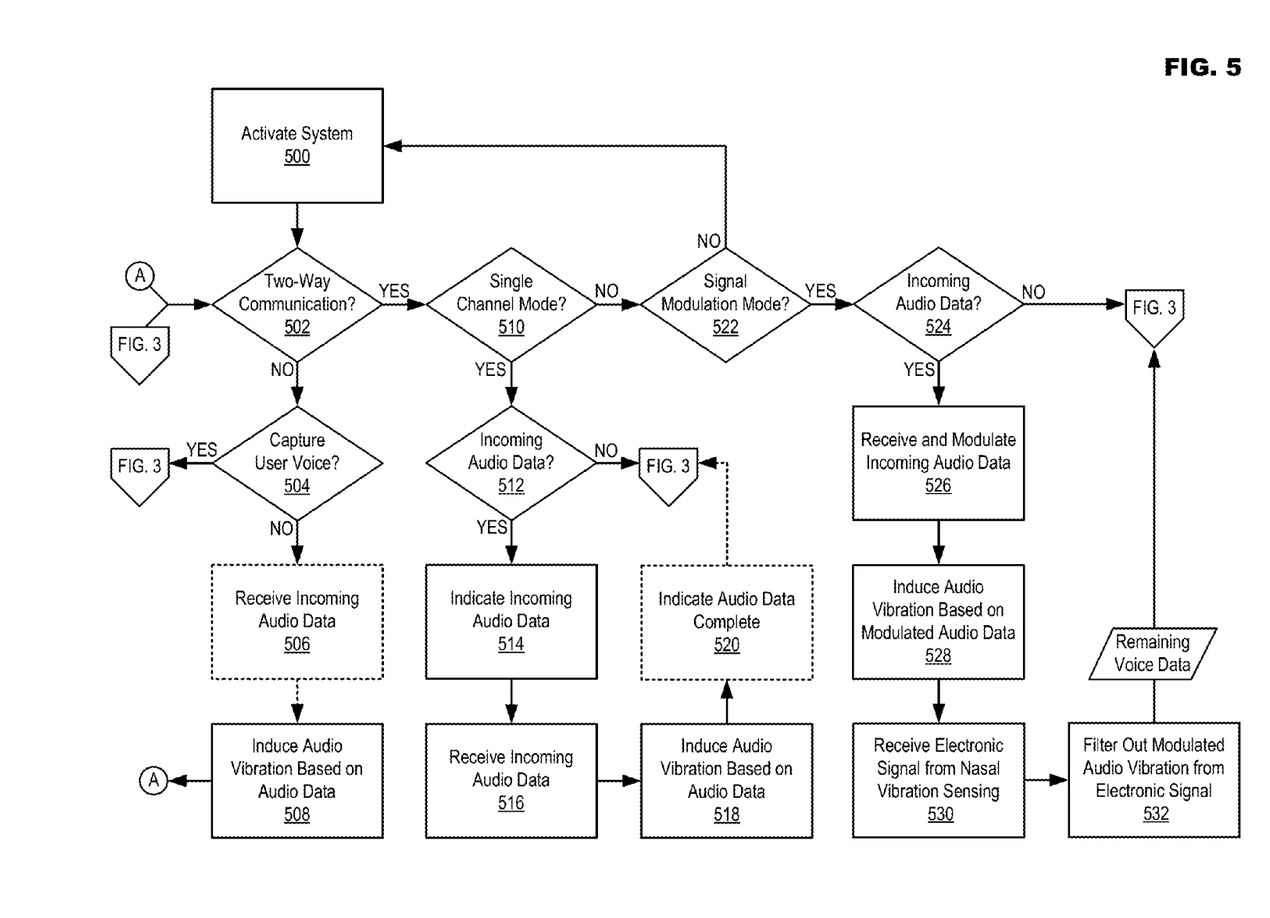
FIG. 5 illustrates example operations for sound capture and generation via nasal vibration in accordance with at least one embodiment of the present disclosure.

FIG. 5 illustrates example operations for sound capture and generation via nasal vibration in accordance with at least one embodiment of the present disclosure. The operations illustrated in FIG. 5 relate to different operational modes available in a system. Not all of the operations are required for all of the operational modes. Thus, while the entire operational flow shown in FIG. 5 allows a system to select a particular operational mode from the available operational modes, a subset of these operations may be used in systems that operate utilizing fewer operational modes.

In operation 500 the system may be activated. A determination may then be made in operation 502 as to whether the system is initiating or engaged in two-way communication. If in operation 502 it is determined that the system is not engaged in two way communication, then in operation 504 a further determination may be made as to whether to only capture the voice of the user. A determination in operation 504 that only user voice will be captured may be followed by operations 300 to 312 in FIG. 3 to capture the user's voice via nasal vibration sensing. Operation 312 may be followed by a return to operation 502. Returning to operation 504, a determination that user voice will not be captured may be followed operation 506 wherein incoming audio data may be received from an external device. The dotted outline of operation 506 indicates that the operation may only be performed if necessary (e.g., the audio data may already be present in the system if it is not being downloaded, streamed, etc. from an external device). In operation 508, audio vibration may be induced in the nose (e.g., nasal bone) of the user based on the audio data. Operation 508 may be followed by a return to operation 502.

Returning to operation 502, if a determination is made that the system is initiating or engaged in two-way communication, then in operation 510 a further determination may be made as to whether the system will utilize a single channel operational mode. If in operation 510 it is determined that the system will utilize a single channel operational mode, then in operation 512 a determination may be made as to whether there is incoming audio data (e.g., from another person participating in a phone call). A determination in operation 512 that there is no incoming audio data may be followed by operations 300 to 312 in FIG. 3 to capture the user's voice via nasal vibration sensing. Operation 312 may be followed by a return to operation 502. Returning to operation 512, if it is determined that audio data is incoming, then in operation 514 the system may indicate the incoming audio data to the user (e.g., with a tone, vibration, etc.). Audio data may then be received in operation 516, and in operation 518 audio vibration may be induced in the nose of the user based on the audio data. In optional operation 520 the end of the audio data may be indicated to the user (e.g., with a tone, vibration, etc.) so that the user may be informed that he/she may talk (e.g., that voice capture may resume). Operation 520 may be followed by operations 300 to 312 in FIG. 3 to capture the user's voice via nasal vibration sensing. Operation 312 may be followed by a return to operation 502.

Returning to operation 510, a determination that the system will not utilize the single channel operational mode may be followed by operation 522 wherein a further determination may be made as to whether the system will utilize signal modulation mode. If it is determined in operation 524 that the system will utilize signal modulation mode, then in operation 524 a further determination may be made as to whether there is any incoming audio data. A determination in operation 524 that there is no incoming audio data may be followed by operations 300 to 312 in FIG. 3 to capture the user's voice via nasal vibration sensing. Operation 312 may be followed by a return to operation 502. If in operation 534 it is determined that there is incoming audio data, then in operation 526 the incoming audio data may be received and modulated, or alternatively the signal used to drive sensing circuitry in the system to generate the audio vibration may be modulated. In operation 528 audio vibrations may be induced in the nose of the user using the modulated audio data. Given that the system comprises separate sets of sensing circuitry (e.g., piezoelectric diaphragms) to induce audio vibration and sense voice vibration, respectively, then the user of the system speaking during the generation of the audio vibration may result in both the user's voice and the audio vibration being captured. The electronic signal generated by the sensing circuitry that senses voice vibration may then include combined voice and audio data. The electronic signal that possibly includes both voice and audio data may then be received in operation 530. In operation 532 the modulated audio data may be filtered out from the electronic signal (e.g., by control circuitry in the system) to yield an electronic signal that only includes the voice data. Operation 532 may be followed by operations 306 to 312 in FIG. 3 to process the remaining voice data extracted from the mixed voice and audio vibration signal in operation 532. Operation 312 may be followed by a return to operation 502. Returning to operation 522, if it is determined that signal modulation mode will not be utilized then the communication operations may be complete. Operation 522 may be followed by a return to operation 500 to await the next activation of the system.

While FIGS. 3 and 5 illustrate operations according to different embodiments, it is to be understood that not all of the operations depicted in FIGS. 3 and 5 are necessary for other embodiments. Indeed, it is fully contemplated herein that in other embodiments of the present disclosure, the operations depicted in FIGS. 3 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure pertains to a system for sound capture and generation via nasal vibration. An example system to capture and generate sound may comprise at least a frame wearable by a user, sensing circuitry mounted to the frame and a device also mounted to the frame. The sensing circuitry may sense voice vibration induced in the user's nose by the user's voice, generate an electronic signal based on the sensed voice vibration and induce audio vibration in the nose based on audio data. The device may be to at least control the operation of the sensing circuitry. The sensing circuitry may comprise at least one piezoelectric diaphragm to generate the electronic signal and induce the audio vibration. In at least one example implementation, the frame may be for eyeglasses and may comprise at least one nosepiece structure for contacting the nose, the at least one structure including the sensing circuitry.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for sound capture and generation via nasal vibration, as provided below.

According to example 1 there is provided a system to capture and generate sound. The system may comprise a frame wearable by a user, sensing circuitry mounted to the frame, wherein the sensing circuitry is to sense voice vibration induced in the user's nose by the user's voice, generate an electronic signal based on the sensed voice vibration and induce audio vibration in the nose based on audio data and a device mounted to the frame, wherein the device is to at least control the operation of the sensing circuitry.

Example 2 may include the elements of example 1, wherein the frame is an eyeglass frame comprising at least one nosepiece to contact the nose, the at least one nosepiece including at least the sensing circuitry.

Example 3 may include the elements of any of examples 1 to 2, wherein the sensing circuitry comprises at least one piezoelectric diaphragm to generate the electronic signal and induce the audio vibration.

Example 4 may include the elements of example 3, wherein the at least one piezoelectric diaphragm is coupled to the device via at least one wire.

Example 5 may include the elements of any of examples 3 to 4, wherein the at least one piezoelectric diaphragm is coupled to the device via a wireless link.

Example 6 may include the elements of any of examples 3 to 5, wherein the sensing circuitry comprises a plurality of piezoelectric diaphragms coupled in series.

Example 7 may include the elements of any of examples 3 to 6, wherein the sensing circuitry comprises a first sensing circuit to sense the voice vibration and a second sensing circuit to induce the audio vibration.

Example 8 may include the elements of example 7, wherein the first sensing circuit is configured to engage a first side of the nose and the second sensing circuit is configured to engage a second side of the nose.

Example 9 may include the elements of any of examples 7 to 8, wherein the second sensing circuit comprises at least one piezoelectric diaphragm configured to operate as a transducer.

Example 10 may include the elements of any of examples 1 to 9, wherein the device comprises at least control circuitry to determine whether the system is initiating or engaged in two-way communication.

Example 11 may include the elements of example 10, wherein if the control circuitry determines that the system is not initiating or engaged in two-way communication, the control circuitry is to generate voice data based on the electronic signal or cause the sensing circuitry to induce the audio vibration based on the audio data.

Example 12 may include the elements of example 11, wherein if the control circuitry determines that the system is initiating or engaged in two-way communication, the control circuitry is to operate in single channel mode.

Example 13 may include the elements of example 12, wherein in single channel mode the control circuitry is to cause the sensing circuitry to generate an indication at least when audio data is incoming, cause the sensing circuitry to induce the audio vibration based on the audio data and, when no audio data is incoming, generate the voice data based on the electronic signal.

Example 14 may include the elements of example 13, wherein the indication comprises at least one of an audible or tactile notification.

Example 15 may include the elements of any of examples 13 to 14, and may further comprise the control circuitry causing the sensing circuitry to generate a second indication when the incoming audio data is complete.

Example 16 may include the elements of any of examples 11 to 15, wherein if the control circuitry determines that the system is initiating or engaged in two-way communication, the control circuitry is to operate in single channel mode in which the control circuitry is to cause the sensing circuitry to generate an indication at least when audio data is incoming, cause the sensing circuitry to induce the audio vibration based on the audio data and, when no audio data is incoming, generate the voice data based on the electronic signal.

Example 17 may include the elements of any of examples 11 to 16, wherein if the control circuitry determines that the system is initiating or engaged in two-way communication, the control circuitry is to operate in signal modulation mode.

Example 18 may include the elements of example 17, wherein in signal modulation mode the control circuitry is to modulate the audio data, cause the sensing circuitry to induce the audio vibration based on the modulated data, receive the electronic signal, filter out the audio vibration from the electronic signal and generate the voice data based on the electronic signal.

Example 19 may include the elements of any of examples 11 to 18, wherein if the control circuitry determines that the system is initiating or engaged in two-way communication, the control circuitry is to operate in signal modulation mode in which the control circuitry is to modulate the audio data, cause the sensing circuitry to induce the audio vibration based on the modulated data, receive the electronic signal, filter out the audio vibration from the electronic signal and generate the voice data based on the electronic signal.

Example 20 may include the elements of any of examples 1 to 19, wherein the device comprises at least communication circuitry to at least one of transmit the voice data to an external device or receive the audio data from the external device.

According to example 21 there is provided a method for capturing and generating sound. The method may comprise activating a system wearable by a user, determining whether the system is initiating or engaged in two-way communication, controlling, based on the determination, sensing circuitry in the system to at least one of sense voice vibration induced in the user's nose by the user's voice and generate an electronic signal based on the voice vibration; or induce audio vibration in the nose based on audio data.

Example 22 may include the elements of example 21, and may further comprise generating voice data based on the electronic signal.

Example 23 may include the elements of any of examples 21 to 22, wherein if it determined that the system is initiating or engaged in two-way communication, further comprising operating in single channel mode.

Example 24 may include the elements of example 23, wherein operating in single channel mode comprises causing the sensing circuitry to generate an indication at least when audio data is incoming, causing the sensing circuitry to induce the audio vibration based on the audio data; and when no audio data is incoming, generating the voice data based on the electronic signal.

Example 25 may include the elements of example 24, wherein the indication comprises at least one of an audible or tactile notification.

Example 26 may include the elements of any of examples 24 to 25, and may further comprise causing the sensing circuitry to generate a second indication when the incoming audio data is complete.

Example 27 may include the elements of any of examples 21 to 26, wherein if it determined that the system is initiating or engaged in two-way communication, further comprising operating in signal modulation mode.

Example 28 may include the elements of example 27, wherein operating in signal modulation mode comprises modulating the audio data, causing the sensing circuitry to induce the audio vibration based on the modulated audio data, receiving the electronic signal, filtering out the audio vibration from the electronic signal and generating voice data based on the electronic signal.

Example 29 may include the elements of any of examples 21 to 28, and may further comprise at least one of transmitting the voice data to an external device or receiving the audio data from the external device.

According to example 30 there is provided a system for capturing and generating sound including at least one device, the system being arranged to perform the method of any of the above examples 21 to 29.

According to example 31 there is provided a chipset arranged to perform the method of any of the above examples 21 to 29.

According to example 32 there is provided at least one machine readable medium comprising a plurality of instructions that, in response to be being executed on a computing device, cause the computing device to carry out the method according to any of the above examples 21 to 29.

According to example 33 there is provided at least one device configured for capturing and generating sound, the at least one device being arranged to perform the method of any of the above examples 21 to 29.

According to example 34 there is provided a system for capturing and generating sound. The system may comprise means for activating a system wearable by a user, means for determining whether the system is initiating or engaged in two-way communication, means for controlling, based on the determination, sensing circuitry in the system to at least one of sense voice vibration induced in the user's nose by the user's voice and generate an electronic signal based on the voice vibration or induce audio vibration in the nose based on audio data.

Example 35 may include the elements of example 34, and may further comprise means for generating voice data based on the electronic signal.

Example 36 may include the elements of any of examples 34 to 35, wherein if it determined that the system is initiating or engaged in two-way communication, further comprising means for operating in single channel mode.

Example 37 may include the elements of example 36, wherein the means for operating in single channel mode comprise means for causing the sensing circuitry to generate an indication at least when audio data is incoming, means for causing the sensing circuitry to induce the audio vibration based on the audio data and means for, when no audio data is incoming, generating the voice data based on the electronic signal.

Example 38 may include the elements of example 37, wherein the indication comprises at least one of an audible or tactile notification.

Example 39 may include the elements of any of examples 37 to 38, and may further comprise means for causing the sensing circuitry to generate a second indication when the incoming audio data is complete.

Example 40 may include the elements of any of examples 34 to 39, wherein if it determined that the system is initiating or engaged in two-way communication, further comprising means for operating in signal modulation mode.

Example 41 may include the elements of example 40, wherein the means for operating in signal modulation mode comprise means for modulating the audio data, means for causing the sensing circuitry to induce the audio vibration based on the modulated audio data, means for receiving the electronic signal, means for filtering out the audio vibration from the electronic signal and means for generating voice data based on the electronic signal.

Example 42 may include the elements of any of examples 34 to 41, and may further comprise at least one of means for transmitting the voice data to an external device or means for receiving the audio data from the external device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to capture and generate sound, comprising:
   eyeglasses comprising a frame wearable by a user, said frame comprising a long arm;
   a sensing circuit mounted to the frame, wherein the sensing circuitry comprises a single sensor that is operable in a passive sensing mode and an active inducement mode, wherein:
   in the passive sensing mode the single sensor is configured to passively sense voice vibration induced in the users nose by the user's voice and generate an electronic signal based on the sensed voice vibration; and
   in the active inducement mode the single sensor is configured to actively induce audio vibration in the user's nose based on audio data; and
   a device incorporated within said long arm, the device comprising a speaker, wherein:

the device comprises control circuitry to at least control the operation of the sensing circuit and to cause the single sensor to transition between the passive sensing mode and the active inducement mode;

wherein the control circuitry is to determine whether the system is initiating or engaged in two-way communication, wherein when the control circuitry determines that the system is not initiating or engaged in two-way communication, the control circuitry is to:

configure said single sensor to passively sense said voice vibration and generate voice data based on the electronic signal; or configure the single sensor to actively induce the audio vibration based on the audio data.

2. The system of claim 1, wherein:

the frame is an eyeglass frame comprising at least one nosepiece to contact the nose; and the at least one nosepiece comprises the sensing circuit.

3. The system of claim 1, wherein the sensing circuit comprises at least one piezoelectric diaphragm that is configured to generate the electronic signal and to induce the audio vibration.

4. The system of claim 1, wherein when the control circuitry determines that the system is initiating or engaged in two-way communication, the control circuitry is to operate in single channel mode such that the single sensor only passively senses said voice vibration or only actively induces said audio vibration.

5. The system of claim 4, wherein in single channel mode the control circuitry is to cause the sensing circuit to generate an incoming audio indication to signal incoming audio data to the user; and to generate another indication to signal that all incoming audio data has been presented to the user.

6. The system of claim 1, wherein when the control circuitry determines that the system is initiating or engaged in two-way communication, the control circuitry and the sensing circuit are to operate in signal modulation mode, wherein in the signal modulation mode the control circuitry is to:

modulate the audio data and to cause the single sensor to actively induce said audio vibration based only on the modulated audio data;

receive the electronic signal from the sensing circuit;

filter out the modulated audio data from the electronic signal received from the sensing circuit; and generate an electronic signal containing only said voice data.

7. The system of claim 1, wherein the device comprises at least communication circuitry to at least one of transmit the voice data to an external device or receive the audio data from the external device.

8. A method for capturing and generating sound, comprising:

providing a system comprising eyeglasses comprising a frame wearable by a user, wherein said frame comprises a long arm configured to extend over an ear of the user, said eyeglasses further comprising a sensing circuit mounted to said frame, and a device incorporated within said long arm, wherein the sensing circuit comprises a single sensor operable in a passive sensing mode and an active inducement mode, the device comprises a speaker, and the device comprises a controller to at least control the operation of said sensing circuit;

determining with the controller whether the system is initiating or engaged in two-way communication;

based on the determination, configuring the single sensor with the controller to operate in the passive sensing mode or the active inducement mode, wherein:

in the passive sensing mode the single sensor is to passively sense voice vibration induced in the user's nose by the user's voice and generate an electronic signal based on the voice vibration; and in the active inducement mode the single sensor is to actively induce audio vibration in the user's nose based on audio data.

9. The method of claim 8, further comprising:

generating voice data based on the electronic signal.

10. The method of claim 8, wherein when it is determined that the system is initiating or engaged in two-way communication, the method further comprises configuring said system with said controller to operate in a single channel mode, in which the single sensor operates in said passive sensing more or said active inducement mode.

11. The method of claim 10, wherein when the system is operating the system in single channel mode, the method further comprises:

causing the sensing circuit to generate an incoming audio indication to signal incoming audio data to the user, and to induce the audio vibration based on the audio data; and causing the sensing circuit to generate another indication when all incoming audio data has been presented to the user.

12. The method of claim 8, wherein when it is determined that the system is initiating or engaged in two-way communication, the method further comprises causing the system to operate in a signal modulation mode, wherein in the signal modulation module the method further comprises:

modulating the audio data;

causing the single sensor to actively induce said audio vibration based only on the modulated audio data;

filtering the modulated audio data from the electronic signal; and generating an electronic signal containing only said voice data.

13. The method of claim 8, further comprising at least one of:

transmitting the voice data to an external device; or receiving the audio data from the external device.

14. At least one non-transitory machine-readable storage medium disposed in a wearable system comprising eyeglasses comprising a frame wearable by a user, wherein said frame comprises a long arm, said eyeglasses further comprising a sensing circuit mounted to said frame, and a device incorporated within said long arm, wherein the sensing circuit comprises a single sensor operable in a passive sensing mode and an active inducement mode, the device comprises a speaker, and the device comprises a controller to at least control the operation of said sensing circuit, said medium having stored thereon, individually or in combination, instructions that when executed one or more processors cause the performance of the following operations comprising:

determining, with the controller, whether the system is initiating or engaged in two-way communication;

configuring, based on the determination, the single sensor with the controller to operate in the passive sensing mode or the active inducement mode, wherein:

in the passive sensing mode the single sensor is to passively sense voice vibration induced in the user's nose by the user's voice and generate an electronic signal based on the voice vibration; and in the active inducement mode the single sensor is to actively induce audio vibration in the nose based on audio data.

15. The non-transitory storage medium of claim 14, further comprising instructions that, when executed by said one or more processors, cause the one or more processors to perform the following operations comprising:

generate voice data based on the electronic signal.

16. The non-transitory storage medium of claim 14, wherein when it is determined that the system is initiating or engaged in two-way communication, said instructions when executed further cause the one or more processors to perform the following operations comprising:

causing the system to operate in single channel mode, in which the single sensor is configured to passively sense said voice vibration and voice data is generated based on the electronic signal; or the single sensor is configured to actively induce the audio vibration based on the audio data.

17. The non-transitory storage medium of claim 16, wherein when the system is operating in a single channel mode, the instructions when executed further cause the one or more processors to perform the following operations comprising:

causing the sensing circuit to generate an incoming audio indication to signal incoming audio data to the user; and causing the sensing circuit to generate another indication when all incoming audio data has been presented to the user.

18. The non-transitory storage medium of claim 14, wherein when it is determined that the system is initiating or engaged in two-way communication, said instructions when executed further cause said one or more processors to perform the following additional operations comprising:

causing the system to operate in a signal modulation mode, wherein operation in the signal modulation mode comprises:

modulating the audio data;

causing the single sensor to actively induce said audio vibration based only on the modulated audio data;

filtering the modulated audio data from the electronic signal; and generating an electronic signal containing only said voice data.

19. The non-transitory storage medium of claim 14, wherein said instructions when executed further cause said one or more processors to perform the following additional operations comprising:

causing transmission of the voice data to an external device; or causing reception of the audio data from the external device.

* * * * *